United States Patent [19]

Kobayashi et al.

[11] Patent Number: 4,890,169

[45] Date of Patent: Dec. 26, 1989

[54] MAGNETIC TAPE RECORDING AND/OR REPRODUCING APPARATUS WITH SLOW MOTION EFFECT

[75] Inventors: Tetsuo Kobayashi; Masaharu Hayakawa, both of Nagaokakyo, Japan

[73] Assignee: Mitsubishi Denki Kabushiki Kaisha, Tokyo, Japan

[21] Appl. No.: 41,993

[22] Filed: Apr. 24, 1987

[30] Foreign Application Priority Data

Apr. 28, 1986 [JP] Japan ................................ 61-100625

[51] Int. Cl.$^4$ ............................................. H04N 5/782
[52] U.S. Cl. .................................. 360/10.3; 358/340; 358/336; 360/38.1
[58] Field of Search ............... 358/314, 327, 336, 340, 358/312; 360/9.1, 10.1, 10.3, 10.2, 33.1, 38.1, 71, 73, 77, 78, 70

[56] References Cited

U.S. PATENT DOCUMENTS

| 4,306,255 | 12/1981 | Misaki et al. | 360/10.3 |
| 4,338,631 | 7/1982 | Ota | 360/10.3 X |
| 4,531,162 | 7/1985 | Tokumitsu | 360/10.3 |
| 4,639,439 | 3/1987 | Tanaka | 360/10.3 |

FOREIGN PATENT DOCUMENTS

| 2754353 | 6/1979 | Fed. Rep. of Germany . |
| 2823470 | 8/1982 | Fed. Rep. of Germany . |
| 3223131 | 11/1985 | Fed. Rep. of Germany . |
| 2009998 | 6/1979 | United Kingdom . |
| 1587798 | 4/1981 | United Kingdom . |
| 2104275 | 3/1983 | United Kingdom . |

OTHER PUBLICATIONS

IEEE Transactions on Consumer Electronics, Publication, vol. CE-26, Feb., 1980, pp. 121 through 128.

*Primary Examiner*—Robert L. Richardson
*Attorney, Agent, or Firm*—Birch, Stewart, Kolasch & Birch

[57] ABSTRACT

A magnetically recorded information reproducing apparatus, of a helical scan type, capable of carrying out a slow motion picture reproduction by repeating a still picture reproduction and a normal picture reproduction alternately by means of at least two head assemblies, which are supported for rotation about a common axis, while a length of magnetic tape having video signals recorded thereon is intermittently moved. The apparatus comprises a detecting circuit for detecting a noise position at which the level of the video signal being reproduced decreases to a value lower than a predetermined value. It further comprises a control circuit operable in response to an output signal from the detecting circuit to control the timing, at which interruption of movement of the length of magnetic tape is to be effected, so as to cause the noise position to shift into the period of a vertical synchronizing signal contained in the video signal being reproduced.

16 Claims, 8 Drawing Sheets

MAGNETIC TAPE RECORDING AND/OR REPRODUCING APPARATUS WITH SLOW MOTION EFFECT

BACKGROUND OF THE INVENTION

1. Field of Technology

The present invention generally relates to a magnetic tape recording and/or reproducing apparatus and, more particularly, to an improvement in noiseless reproduction of a slow motion effect in the magnetic tape recording and/or reproducing apparatus.

2. Description of the Prior Art

A video tape recording and/or reproducing apparatus, or a video tape player for short, having a capability of creating a plurality of altered motion effects including, in addition to a normal picture motion effect, a slow motion effect, a stop motion effect, a reverse motion effect and so on is well known in the art and is currently widely used in the ordinary home.

An example of prior art video tape player and particularly the circuit arrangement employed therein, in connection with the slow motion reproduction of information from an information carrier medium, (that is, a length of magnetic tape,) will be discussed with reference to FIGS. 1 and 2 of the accompanying drawings.

FIG. 1 illustrates the enlarged segment of the magnetic tape having field tracks recorded thereon and the circuit arrangement of the prior art video tape player which is associated with the slow motion reproduction of the information. FIG. 2 illustrates waveforms of various signals appearing in the prior art video tape player which are shown in a timing relationship.

Referring first to FIG. 1, the prior art video tape player, generally identified by 10, comprises a tape guide cylinder around which a length of magnetic tape 1, running from a supply reel 14 towards a take-up reel 15, is movably turned through a predetermined angle, for example, 180°. As is well known to those skilled in the art, while the supply and take-up reels 14 and 15 are accommodated within a standardized cassette in spaced relationship, with opposite ends of the magnetic tape 1 secured respectively thereto, the tape guide cylinder is comprised of a stationary drum and a rotary drum 11 supported above the stationary drum in coaxial relation therewith and for rotation in one direction relative thereto. The rotary drum 11 is drivingly coupled with a drive motor 20 and has a plurality of, for example, two, transducing head assemblies 12 and 13 carried thereby for rotation together therewith. The head assemblies 12 and 13 are spaced a predetermined angle, for example, 180°, from each other in a direction circumferentially of the rotary drum 11. Each of the transducing head assemblies 12 and 13 is concurrently utilized for recording and reproducing information on and from the magnetic tape, respectively, at a time in a conventional manner.

The length of magnetic tape 1 is moved along a predetermined operative path between the supply reel 14 and the take-up reel 15 by any conventional means which, in the illustrated instance, consists of a rotating capstan 16 drivingly coupled with a capstan motor 25, against which capstan 16 is pulled the magnetic tape 1 by a pinch roller 17. Adjacent a portion of the operative path for the travel of the magnetic tape 1, between the tape guide cylinder and the capstan 16, there is disposed a control signal recording and reproducing head 18 for recording or reproducing a control signal c on or from a control track 4 on the magnetic tape 1. Control signal c is a reference signal used to control the transport of the magnetic tape 1 from the supply reel 14 onto the take-up reel 15. The control signal recording and reproducing head 18, referred to above, is hereinafter referred to as "CTL head" for the sake of brevity.

As best shown in the upper portion of FIG. 1, a segment of the magnetic tape 1 is shown to have a number of information recorded tracks track 2 and 3 thereon, together with arrows x and y which respectively illustrate the direction of movement of the magnetic tape 1 from the supply reel 14 onto the take-up reel 15 around the tape guide cylinder, and the direction of scan of the transducing head assemblies 12 and 13 relative to the magnetic tape 1. As a matter of design practice in the known helical scan video tape player, when moving past the tape guide cylinder, the magnetic tape 1 extends generally slantwise relative to the plane of rotation of the transducing head assemblies 12 and 13; The and recorded tracks 2 and 3 are inclined at a predetermined angle relative to the longitudinal or lengthwise direction of the magnetic tape 1. More specifically, the beginning of one field signal recorded on each track 2 and 3 is located adjacent a lower side edge of the length of magnetic tape 1 and also adjacent to the control track 4. The end of one such field signal recorded on the respective track 2 and 3 is located adjacent an upper side edge of the same length of magnetic tape 1, with a substantially intermediate portion thereof extending at that predetermined angle relative to the lengthwise direction of the magnetic tape 1.

Where the helical scan video tape player 10 is so designed so as to operate under a VHS (Video Home System) scheme, one of a plurality of recorded tracks on the length of magnetic tape 1, identified by A, is laid down by a magnetic recording and/or reproducing head having a head gap of an azimuth angle of 6°. The next adjacent trailing recorded track, identified by B, on the same length of magnetic tape 1, is laid down by a magnetic recording and/or reproducing head having a head gap of an azimuth angle of −6°. The control c is recorded on the control track 4, and the distance between the position of the control signal c on the control track 4 and the position of the length of magnetic tape 1 where the end of the recorded track B is located, is referred to as "X value"; The X value is fixed at 79.244mm according to the VHS system norm.

Video field signals picked up respectively by the magnetic head assemblies 12 and 13, which are alternately switched on and off in a manner well known to those skilled in the art, are fed to a rotary transformer 30, comprised of windings, carried by the rotary drum 11, and windings fixedly carried by the apparatus, and then, after having been amplified by respective video signal amplifiers 31 and 32, to a head switching circuit 33. These amplifiers 31 and 32 and the circuit 33 constitute a reproducing circuit operable in interlace an output signal from each of the head assemblies for producing a video signal f.

On the other hand, to this head switching circuit 33 is applied a head switching signal a. This signal has been generated from head switching signal detecting heads 22 and 23, spaced a predetermined angle, for example, 180°, from each other in a direction circumferentially of the drum drive motor 20 and operable in cooperation with a head switching signal generating element 21 secured to the drum drive motor 20 for rotation together therewith. The signal has subsequently been amplified and wave-shaped by a head switching signal generator 24. Accordingly, the head switching circuit 33 generates alternately reproduced signals which are picked up initially by the magnetic head assemblies 12 and 13 and then by scanning the recorded tracks 2 and 3. The head switching signal a is, as shown by (a) in FIG. 2, so generated from the head switching signal generator 24 that, when it is in an ON state, the magnetic head assembly 12 can be brought into operation. However when it is in an OFF state, the magnetic head assembly 13 can be brought into operation.

A reproduced video signal f, outputted from the head switching circuit 33, is subjected to a signal processing technique, such as amplification, detection, frequency conversion and other. This is performed in a signal processing circuit 34 and is then supplied to a quasi-vertical synchronizing signal adding circuit 35 from which a reproduced video signal 36 is outputted. The head switching signal a, is processed in the quasi-vertical synchronizing signal generator 46 to produce a quasi-vertical synchronizing signal b, the waveform of which is shown by (b) in FIG. 2. This quasi-vertical synchronizing signal b is, in the event that the vertical synchronizing signal is not properly reproduced because of the presence of noises during the playback of a stop motion picture or the like, applied to the quasi-vertical synchronizing signal adding circuit 35 shown in FIG. 1 where it is added to the reproduced video signal 36. According to the VHS system, since the vertical synchronizing signal is located at a position which has passed 6.5 times the cycle of the horizontal synchronizing signal subsequent to the switching of the head assemblies, a delay time between the set-up and set-down of the head switching signal a, and the quasi-vertical synchronizing signal b, is equally selected.

On the other hand, both the head switching signal a, and the control signal c, picked up by the CTL head 18, are supplied to a capstan control circuit 26. From there a voltage signal proportional to the difference in phase therebetween is outputted. The voltage signal is in turn applied to a capstan motor drive circuit 27 operable to control the rotational speed, i.e., the number of revolution, of the capstan drive motor 25 in dependence on the voltage signal applied thereto. Accordingly, during the normal picture reproduction of video information, the head switching signal a, and the control signal c, have a predetermined phase relationship with each other, whereby the magnetic head assemblies 12 and 13 can properly scan the recorded tracks on the length of magnetic tape 1. The stop motion effect can be accomplished when the transport of the length of magnetic tape 1 is stopped.

In FIG. 1, reference numeral 40 represents a slow motion mode selector switch adapted to be manipulated by a viewer of the video tape player when he or she wishes to view a slowed-down reproduction of video information; Reference numeral 41 represents a delay circuit operable to delay the control signal c, for a predetermined delay time. Reference numeral 41a represents a delay time adjustment operable to adjust the length of delay time t. Reference numeral 42 represents a tape transport control circuit. Reference numeral 45 represents a head switching signal counting circuit. The combination of all of these circuit components constitute a slow motion control device.

Hereinafter, the slow motion reproduction accomplished in the prior art video tape player of the construction described above will be discussed. As it is well known to those skilled in the art, the slow motion reproduction can be accomplished by alternately performing a still picture reproduction and a normal picture reproduction in a manner well known to those skilled in the art.

The relationship between noises produced in the television raster during the still picture reproduction, and the position at which the length of magnetic tape 1 is stopped, will be described with particular reference to FIGS. 3 and 4. During the still picture reproduction, the head assemblies 12 and 13 are employed with each having their respective head gaps laid at the same azimuth angle. Because of this, the head assembly 13 has two magnetic heads, each having their head gaps laid at different azimuth angles. These are selectively utilized during the normal picture reproduction and during the still picture reproduction, one at a time. An electric circuit is necessary to selectively bring the magnetic heads into operation, one at a time, which is not shown in FIG. 1. Assuming that the relationship between the recorded tracks on the length of magnetic tape 1, and the trace 5, of movement of the magnetic head assembly at the time the transport of the magnetic tape 1 is stopped, is such as shown in FIG. 3a. The recorded track actually reproduced, that is, scanned, will be narrow such as represented by hatched areas in FIG. 3a. This is because the azimuth angle of the track A, and the azimuth angles of the respective head gaps of the magnetic head assemblies 12 and 13, match with each other. Therefore, the reproduced video signal f, will be partially dropped out as shown by (f) in FIG. 2. As a result thereof, the drop-out portion of the reproduced video signal when viewed on the screen of a cathode ray tube, represents noise bands appearing in the stop motion picture. The picture will not be properly reproduced.

On the other hand, where the relationship between the recorded track on the length of magnetic tape 1 and the trace 5 of movement of the magnetic head assembly is such as shown in FIG. 3b, the recorded track actually reproduced will be large such as shown by a hatched area in FIG. 3b. This is because the azimuth angle of the track A and the azimuth angles of the respective head gaps of the magnetic head assemblies 12 and 13 match with each other. Therefore, the reproduced video signal f1 will be such as shown by (f1) in FIG. 2. No band noise will appear on the screen of the cathode ray tube.

The manner in which the magnetic tape 1 is moved and stopped during the slow motion reproduction will now be described with reference to FIGS. 1 to 3. When the slow motion selector switch 40 is closed, a slow motion command signal is applied to a tape transport control circuit 42. The tape transport control circuit 42 generates a capstan stop signal d, (the waveform of which is shown by (d) in FIG. 2) to the capstan motor drive circuit 27. This operates to stop the capstan drive motor 25 in response to the capstan stop signal d. A still picture is hereinabove described, which is reproduced at the time the capstan drive motor 25 is brought to a halt.

The head switching signal counting circuit 45 then starts its counting operation. It counts the number of head switching signals a generated subsequent to the interruption of movement of the magnetic tape 1. It further generates a signal e when a predetermined number of the head switching signals a appropriate for a particular slow motion reproduction have been counted. For example, six signals are used in the case where the slow motion reproduction takes place while the magnetic tape 1 is transported at a velocity one sixth of that during the normal picture reproduction. The signal e is, in turn, applied to the tape transport control circuit 42 which then generates a capstan drive signal d1 to the capstan motor drive circuit 27 to drive the capstan drive motor 25. Simultaneously therewith, the delay circuit 41 is brought into operation in response to the signal e to delay the control signal c for a predetermined time tt, as shown in the waveform (d) in FIG. 2. After which, a delayed control signal cc is applied from the delay circuit 41 to the tape transport control circuit 42. In response to the delayed control signal cc, the tape transport control circuit 42 applies a capstan stop signal d, (the waveform of which is shown by (d) in FIG. 2), to cause the capstan motor drive circuit 27 to bring the capstan drive motor 25 to a halt.

Subsequent to the interruption of the movement of the magnetic tape 1, the head switching signal counting circuit 45 starts its counting operation. It counts the number of the head switching signals a applied thereto, and generates the signal e when the predetermined number (that is, six in the instance now under discussion,) of the head switching signals a are counted then signal e is applied to the tape transport control circuit 42. The tape transport control circuit 42 then generates the capstan drive signal d1 which is applied to the capstan motor drive circuit 27 causing the capstan drive motor 25 to be driven. By alternately driving and stopping the magnetic tape 1 through a number of cycles in the manner described hereinabove, the slow motion reproduction can be accomplished.

During this slow motion reproduction, in the event that noises appear on the picture being reproduced, it is customary for the viewer or operator of the video tape player to manipulate the adjustment 41a to adjust the delay time tt to a value t1 (shown in the waveform (d) in FIG. 2). Thus, the appearance of the noises can be substantially eliminated. Specifically, if the delay time tt is adjusted to the value t1 by manipulating the adjustment 41a, the position at which the drop-out portion of the reproduced video signal occurs can, during the still picture reproduction, be brought into alignment with the position where the switching of the head assemblies takes place. That is, it can be synchronized with a vertical synchronizing signal. Therefore, no noise appears on the picture being reproduced. At the same time, the speed of movement of the magnetic tape 1 past the tape guide cylinder is controlled to a predetermined value at which no noise occurs in the picture being reproduced on the cathode ray tube. This is provided, however, the head assemblies scan the position where no noise occurs during the stop motion reproduction, so that the noiseless slow motion reproduction can be accomplished.

However, in the prior art video tape player of the construction hereinabove described, the time which is passed until the capstan drive motor 25 is brought to a halt varies from one product to another. Therefore, the relationship in timing between the head switching signal a or the control signal C and the time at which the capstan 16 is brought to a halt, (that is, the delay time t of the delay circuit 41), has been required to be manually adjusted for each capstan drive motor 25 used in the respective video tape player. Moreover, since in general the X value tends to fluctuate often, (even where the X value differs between the video tape player used to make a recording of information on the magnetic tape and that used to make a reproduction of the recorded magnetic tape). The occasional manual adjustment of the delay time t has been required.

In view of the foregoing, not only are generally complicated procedures required to handle the prior art video tape player, but also the precise adjustment of the delay time is difficult to achieve.

SUMMARY OF THE INVENTION

The present invention has, accordingly, been devised with a view to substantially eliminating the above discussed problems inherent in the prior art video tape player. It has for its essential object been designed to provide an improved video tape player effective to provide a noiseless slow motion reproduction with no complicated manual adjustment substantially required.

In order to accomplish the above described object of the present invention, there is provided a magnetically recorded information reproducing apparatus. The apparatus is a helical scan type capable of carrying out a still picture reproduction and a normal picture reproduction alternately by means of at least two head assemblies. These assemblies are supported for rotation about a common axis, while a length of magnetic tape having video signals recorded thereon is intermittently moved. The which apparatus comprises a detecting means for detecting a noise position at which the level of the video signal being reproduced decreases to a value lower than a predetermined value. It further comprises and a control means operable in response to an output signal from the detecting means to control the timing, at which interruption of movement of the length of magnetic tape is to be effected. This causes the noise position to shift during the period of a vertical synchronizing signal contained in the video signal being reproduced.

In one preferred embodiment of the present invention, the detecting means comprises: a level detecting circuit for detecting the decrease of the reproduced video signal below the predetermined value; an arithmetic circuit for calculating the difference in phase between an output signal from the level detecting circuit and the vertical synchronizing signal, contained in the reproduced video signal, or an equivalent signal to the vertical synchronizing signal; and a correcting circuit for outputting a correction signal necessary to cause a result of the calculation to exhibit a predetermined phase difference which would be established when the noise position is shifted during the period of the vertical synchronizing signal.

Preferably, the calculating circuit is so designed as to determine the difference in phase in dependence of the output signal from the level detecting circuit and a switch signal used to switching the head assemblies alternately.

BRIEF DESCRIPTION OF THE DRAWINGS

In any event, the present invention will become more clearly understood from the following description of preferred embodiments thereof, when taken in conjunction with the accompanying drawings. However, the preferred embodiment and the drawings are given for the purpose of illustration and explanation only, and are not to be taken as being limitative of the present invention in any way whatsoever. The scope is to be determined solely by the appended claims. In the drawings, like reference numerals denote like parts in the several views, and:

FIGS. 2(a) through 2(f1) are charts showing various waveforms of signals appearing in the circuit shown in FIG. 1;

FIGS. 5(a) through 5(h1) are charts showing the various waveforms of the signals appearing in the circuit shown in FIG. 4;

FIGS. 8(a) through 8(g2) are diagrams similar to FIG. 2, showing another preferred embodiment of the present invention.

DETAILED DESCRIPTION OF THE EMBODIMENTS

Figure 1:
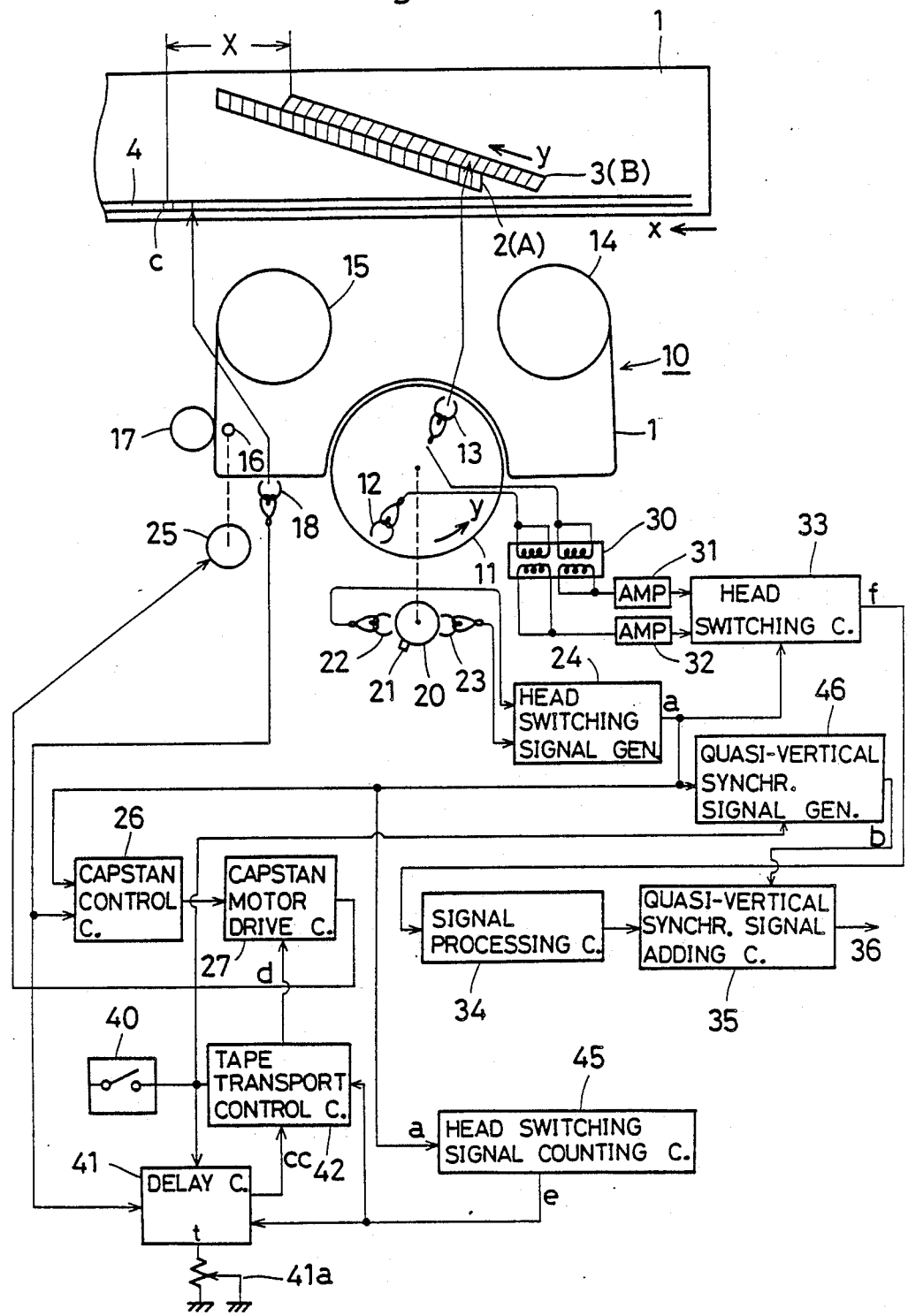
FIG. 1 is a schematic block circuit diagram showing the prior art video tape player.
Figure 2:
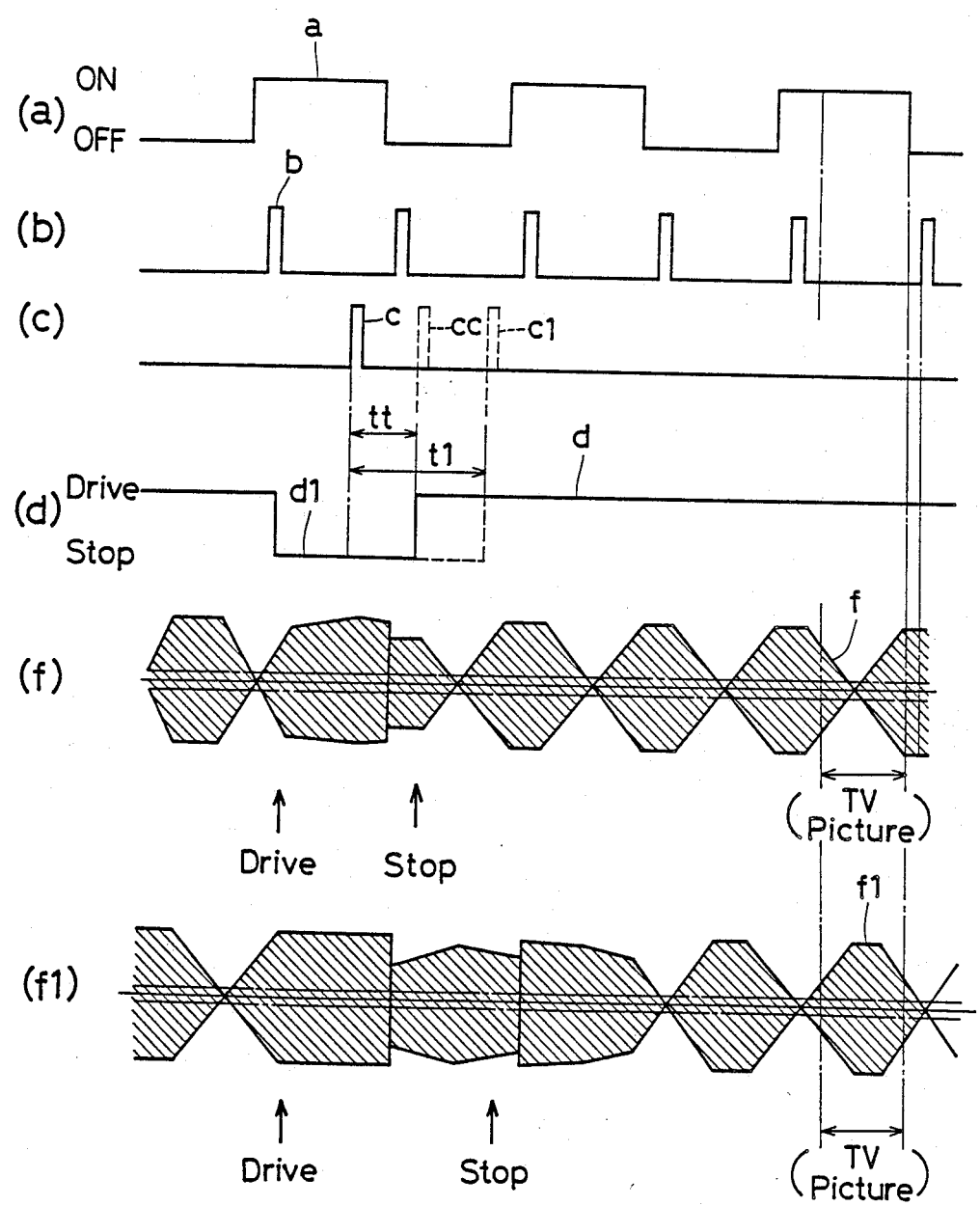
Figure 4:
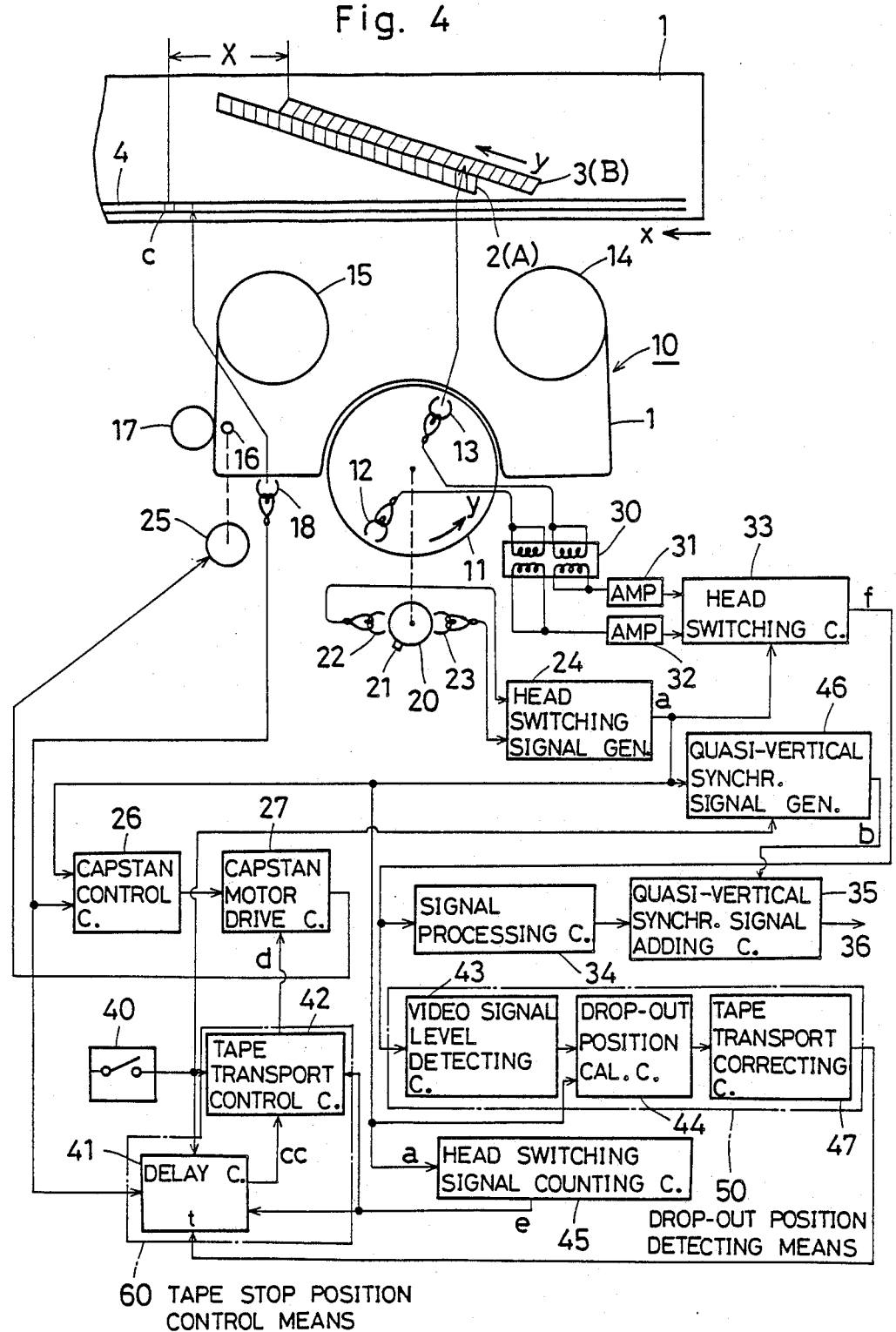
FIG. 4 is a schematic block circuit diagram showing a video tape player embodying the present invention.
Figure 5:
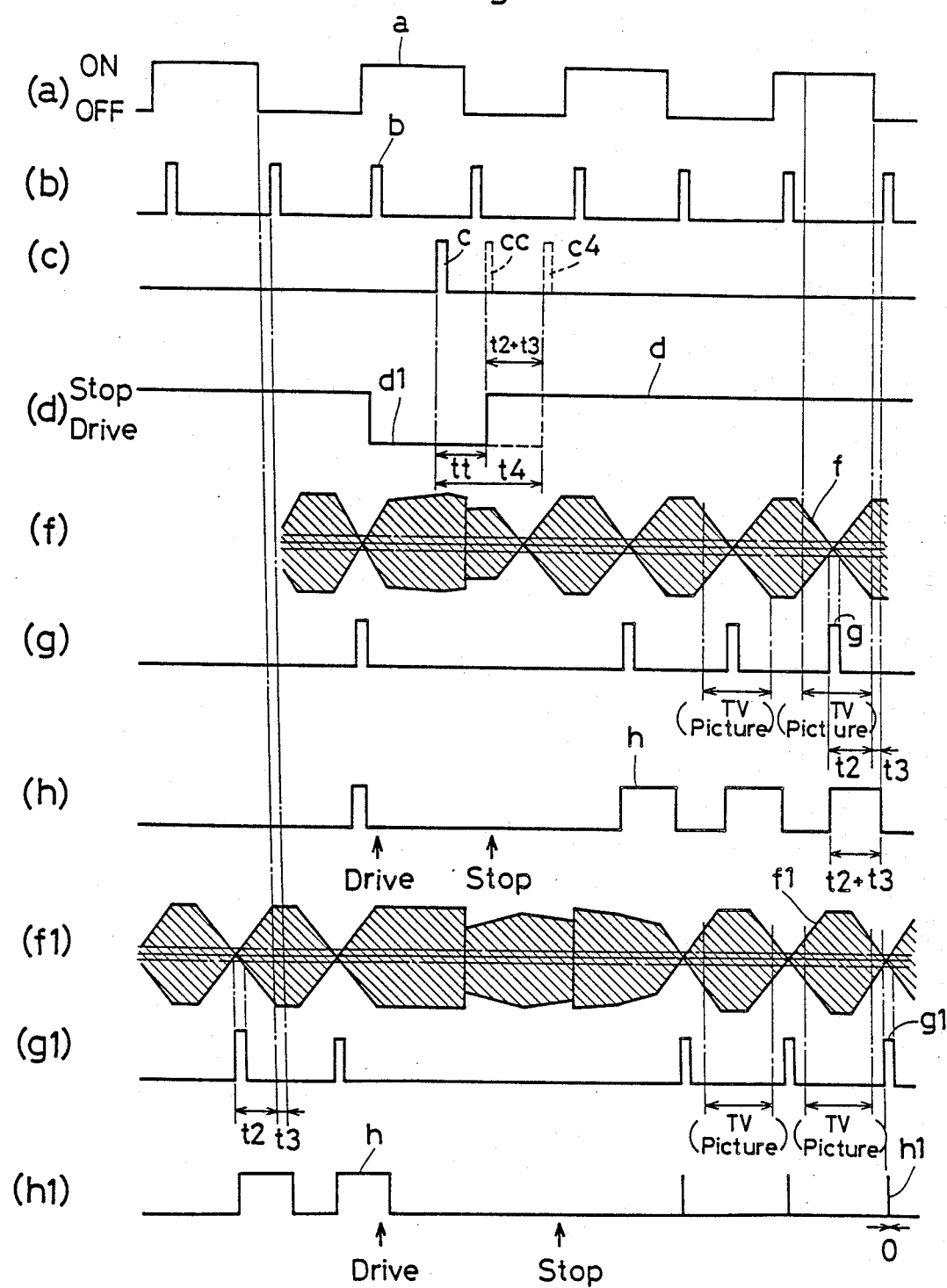

Referring to FIGS. 4 and 5, as can be readily understood from the comparison of FIG. 4 with FIG. 1, the apparatus according to the present invention, broadly speaking, differs from the prior art apparatus in that a drop-out position detecting means is employed as generally identified by 50 in FIG. 4. Consequent upon the use of the drop-out position detecting means 50 in accordance with the present invention, the delay circuit 41 and the tape transport control circuit 42, both referred to in connection with the prior art apparatus of FIG. 1, constitute a tape stop position control means generally identified by 60.

As shown, the drop-out position detecting means 50 includes: a video signal level detecting circuit 43 operable to generate a video drop-out signal g, (the waveform of which is shown by (g) in FIG. 5), when the level of the reproduced video signal f decreases to a value lower than a predetermined level; a drop-out position calculating circuit 44 for generating a drop-out position signal h, (the waveform of which is shown by (h) in FIG. 5), which signal h is indicative of the difference in time between the vertical synchronizing signal, contained in the reproduced video signal, and the video drop-out signal g; and a tape transport correcting circuit 47 for controlling the delay time t of the delay circuit 41 so that the drop-out position signal h can become zero (that is, the difference in time between the vertical synchronizing signal contained in the reproduced video signal and the video drop-out signal g becomes zero).

The apparatus according to the present invention having been constructed as hereinabove described, operates in a manner substantially similar to the prior art apparatus shown in and described with reference to FIG. 1, so far as the normal picture reproduction is concerned. However, when the apparatus, according to the present invention, is set in a slow motion reproduction mode, it operates in a manner different from that according to the prior art. Therefore, the slow motion reproduction performed by the apparatus, according to the present invention, will be particularly described.

When the slow motion mode selector switch 40 is closed as a result of the viewer's or operator's desire to look at the slowed-down reproduction of the video information recorded on the length of magnetic tape 1, the delay circuit 41 is activated to delay the control signal c for a predetermined time tt. The delayed control signal cc, (that is, the control signal c which has been delayed the predetermined time, to, by the delay circuit 41) is then applied to the tape transport control circuit 42. The circuit 42, in response to the delayed control signal cc, generates a capstan stop signal d to the capstan motor drive circuit 27. The capstan motor drive circuit 27 causes the capstan motor 25 to be brought to a halt in response to the capstan stop signal d, applied thereto from the tape transport control circuit 42. The head switching signal counting circuit 45 then counts the number of the head switching signals a applied. When is has counted the predetermined number of the head switching signals a (During this counting operation, still picture reproducing signals equal in number to a predetermined number of still pictures reproduced, are outputted.), the counting circuit 45 generates a signal e to both of the tape transport control circuit 42 and the delay circuit 41.

In response to the signal e, the tape transport control circuit 42 applies a capstan drive signal d1, (the waveform of which is shown by (d) in FIG. 5), to the capstan motor drive circuit 27, which then causes the capstan motor 25 to be driven. At the same time, the delay circuit 41 is activated in response to the signal e to delay the control signal c, for the predetermined time tt. It then applies the delayed control signal cc, (the waveform of which is shown by (c) in FIG. 5) to the tape transport control circuit 42. The tape transport control circuit 42 operates in response to the delayed control signal cc to apply the capstan stop signal d, (the waveform of which is shown by (d) in FIG. 5) to the capstan motor drive circuit 27 which then causes the capstan drive motor 25 to be brought to a halt.

The video signal f reproduced in the head switching circuit 33 of the reproducing circuit after the capstan drive motor 25 has been brought to a halt as hereinabove described, (the waveform of which signal f is shown by (f) in FIG. 5) is inputted to the video signal level detecting circuit 43. This circuit 43 then generates a video drop-out signal g, (the waveform of which is shown by (g) in FIG. 5) during the period in which the level of the reproduced video signal f is lower than the predetermined level. This video drop-out signal g is, together with the head switching signal a, then applied to the drop-out position calculating circuit 44. The drop-out position calculating circuit 44 operates to calculate the difference in timing between the video drop-out signal g and the head switching signal a. This is first applied thereto, subsequent to the application of the video drop-out signal g to the drop-out position calculating circuit 44. It is then applied to generate to the tape transport control circuit 47 a video drop-out position signal h indicative of the time difference corresponding to said difference in timing added with a predetermined value, (the waveform of said video drop-out position signal h being shown by (h) in FIG. 5).

The above described calculation performed by the drop-out position calculating circuit 44 is such that a fixed time t3, corresponding to the length of time from the switching of the head switching signal a to the quasi-vertical synchronizing signal b (the waveform of said signal b being shown by (b) in FIG. 5), is added to the length of time t2, (as indicated in the waveform (g) of FIG. 5) between the set-up of the video drop-out signal g to the switching of the head switching signal a. Therefore, the video drop-out position signal h is indicative of the time difference represented by t2+t3.

The tape transport correcting circuit 47 is operable to control the delay circuit 41 in the light of the video drop-out position signal h, applied thereto from the video drop-out position calculating circuit 44, in such a way so as to increase the delay time tt to a value t4 (as indicated in the waveform (d) in FIG. 5). T4 is equal to the sum of the delay time tt plus the time difference t2+t3. It is, however, to be noted that, if the time t4 becomes greater than the cycle of the control signal c, the cycle of the control signal c is correspondingly reduced. Thereafter, when the count performed by the head switching counting circuit 45 attains the predetermined value, the counting circuit 45 generates the signal e which is in turn applied to both of the tape transport control circuit 42 and the delay circuit 41.

The tape transport control circuit 42 generates in response to the signal e so applied, the capstan drive signal d1 which is applied to the capstan motor drive circuit 27 to drive the capstan drive motor 25. On the other hand, the delay circuit 41 is activated in response to the signal e to delay the control signal c for the calculated delay time t4 (that is, t4=tt+tt2+t3) and then to It then generates the delayed control signal c4, (as indicated in the waveform (c) in FIG. 5 (which signal c4 is the control signal c delayed the time t4. The delayed control signal c4 is then applied to the tape transport control circuit 42. This causes the latter to generate the capstan stop signal d, (as indicated in the waveform (d) of FIG. 5) for which signal d is applied to the capstan motor drive circuit 27 to bring the capstan drive motor 25 to a halt.

Figure 3A:
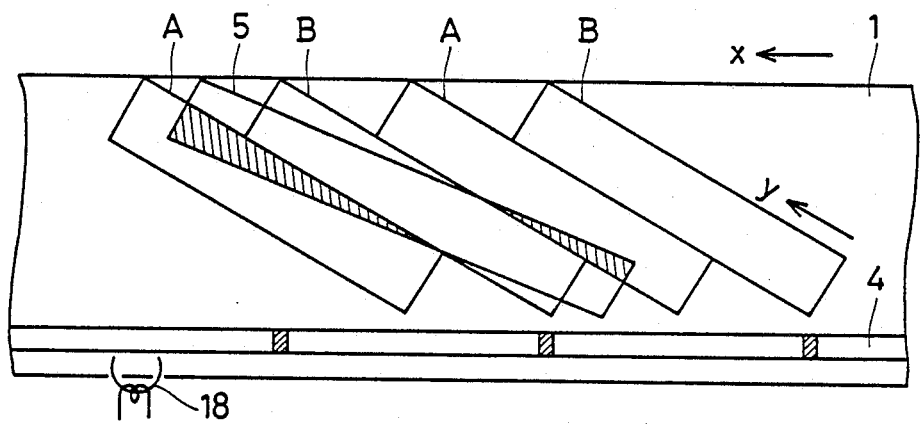
FIG. 3a and 3b are schematic diagrams showing the relationship between the traces of magnetic recording and reproducing head assemblies and the recorded tracks on a length of magnetic tape.
Figure 3B:
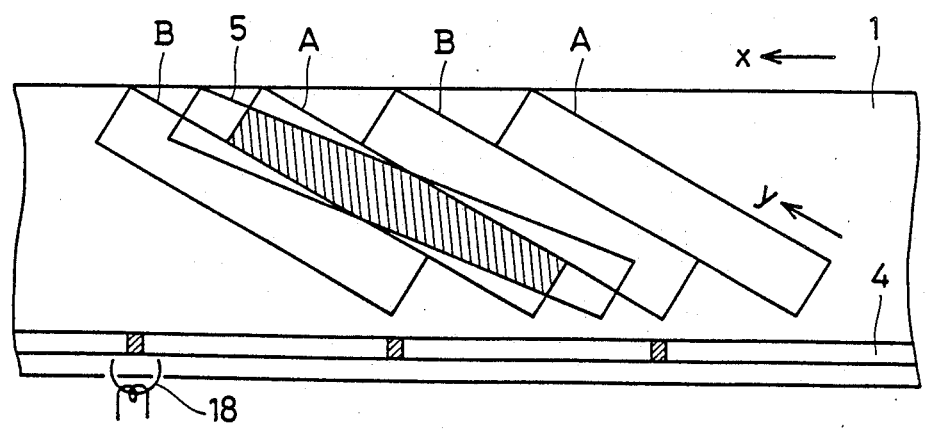

Since the delay time has been increased to the value t4 (as shown in the waveform (d) of FIG. 5) and, consequently, the operation necessary to stop the capstan drive motor 25, hence, the capstan 16 starts at a timing delaying the predetermined time t2+t3 as compared with that during the first still picture reproduction. And further, the distance over which the magnetic tape 1 travels during the period from the start of the operation necessary to stop the capstan 16 and until the capstan 16 is completely stopped, is substantially constant. The relationship in position between the trace 5 of movement of the head assemblies and the recorded tracks 2 and 3 on the length of magnetic tape 1 which is assumed at the time the capstan 16 is completely brought to a halt is such that the magnetic tape 1 has been moved a distance, corresponding to the distance over which the magnetic tape 1 is moved during the period equal to the time t2+t3, in the direction of transport thereof, (that is, leftwards as viewed in FIG. 3a), as compared with that during the preceding cycle of still picture reproduction. Because of this, the position at which the video drop-out signal g occurs is displaced in the same direction at a distance corresponding to the time t2+t3. Therefore, the position at which the magnetic tape 1 is stopped approaches a position where the video drop-out position signal h becomes substantially zero. Waveforms (f1), (g1) and (h1) shown in FIG. 5 represents respective waveforms of the reproduced video signal f1, the video drop-out signal g1 and the video drop-out position signal h1, respectively, which are exhibited during this condition.

Figure 6:
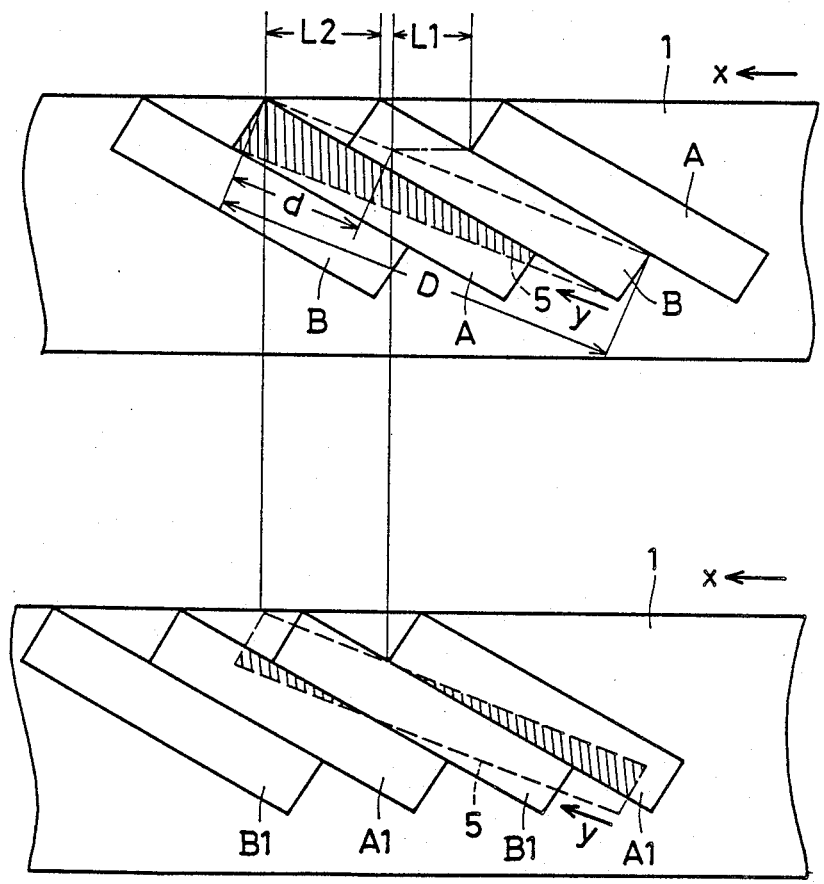
FIGS. 6, 7a, 7b and 7c are schematic diagrams showing the relationship between the traces of magnetic recording and reproducing head assemblies and the recorded tracks on the length of magnetic tape.

The relationship between the displacement of the position at which the magnetic tape 1 is stopped and the resultant change of the video drop-out signal g will now be described with reference to FIG. 6. As shown, the drop-out of the video signal occurs at a lower portion of the recorded track A, (that is, an upper region of the picture reproduced on the screen of a television monitor) in the event that the magnetic tape 1 is stopped at a position in alignment with the recorded track A. The distance L1 between each recorded track A and the corresponding recorded track A1 moved during the time t2+t3 becomes substantially equal to the distance L2, (that is the distance over which the magnetic tape 1 is moved during the normal picture reproduction during the period in which each head assembly scans from a lower portion of the trace 5 of relative movement of the head assemblies to an upper portion thereof (since the distance d is sufficiently small as compared with the total length of the trace 5 of relative movement of the head assemblies. Accordingly, the amount of movement of the magnetic tape 1 required to shift the video drop-out position from the upper region of the picture reproduced on the screen of the television monitor down to a lower region of the same picture appearing on the screen of the television monitor is equal to the amount over which the magnetic tape 1 is moved in a normal picture reproduction mode during the period in which each head assembly scans the recorded track from a lower portion to an upper portion thereof. Assuming that the speed of movement of the magnetic tape 1 during the drive remains the same as that during the normal picture reproduction, the amount of change of the timing at which the operation for stopping the capstan 16 is initiated becomes equal to the amount of change of the video drop-out signal g with time.

Thus, if the timing at which the operation for stopping the capstan 16 is started is delayed a time equal to the sum t2+t3, the video drop-out signal g will be correspondingly delayed a time equal to the sum t2+t3 and will, therefore, match with the quasi-vertical synchronizing signal b, as shown by the waveform (g1) in FIG. 5. Even in the case where the speed of movement of the magnetic tape 1 during the drive of the capstan 16 is not the same as that during the normal picture reproduction, and provided that the speed of movement of the magnetic tape 1 during the drive of the capstan 16 is j times that during the normal picture reproduction (wherein j is an integer smaller than 1), the video drop-out signal g is delayed a time equal to the sum t2+t3 multiplied by j (that is (t2+t3)·j) Therefore, it approaches a position where it matches with the quasi-vertical synchronizing signal b. Accordingly, by repeating the above described operation, a noiseless, still picture reproduction can be obtained. In this way, the still picture reproduction, after the magnetic tape is transported a few times, is substantially free from noises. Therefore, a noiseless slow motion picture can be obtained.

Figure 7A:
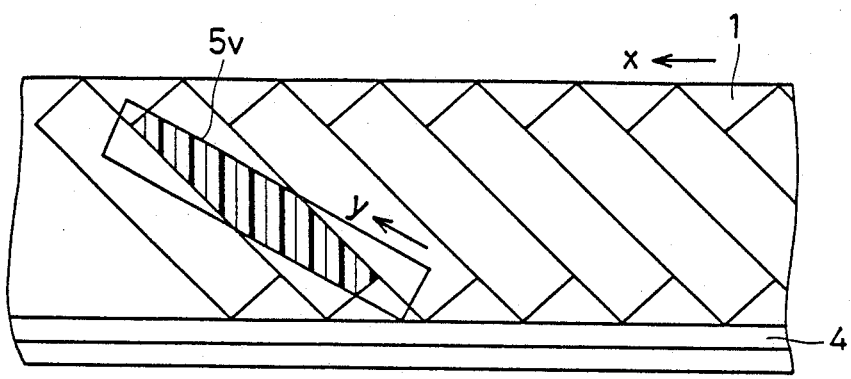
Figure 7B:
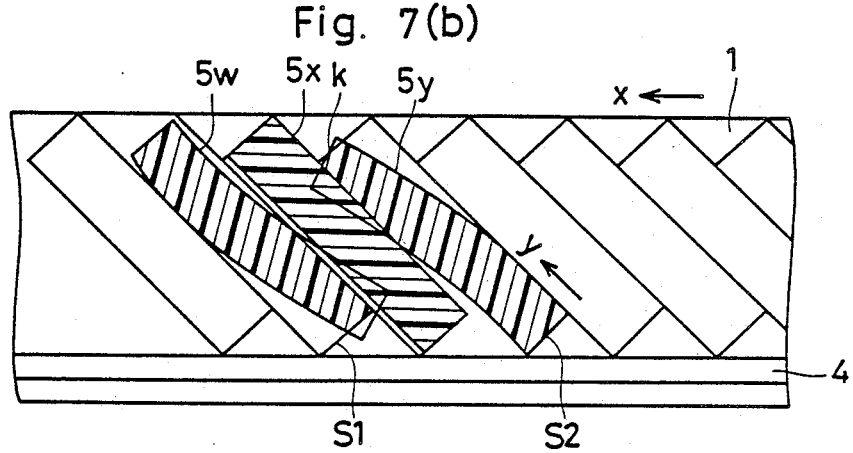
Figure 7C:
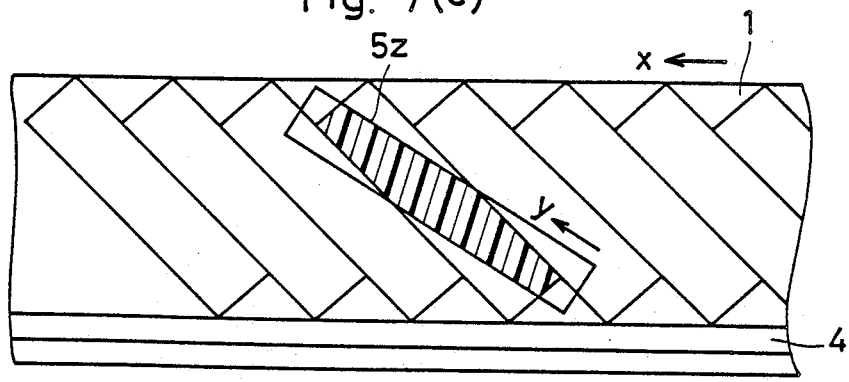
Figure 8:
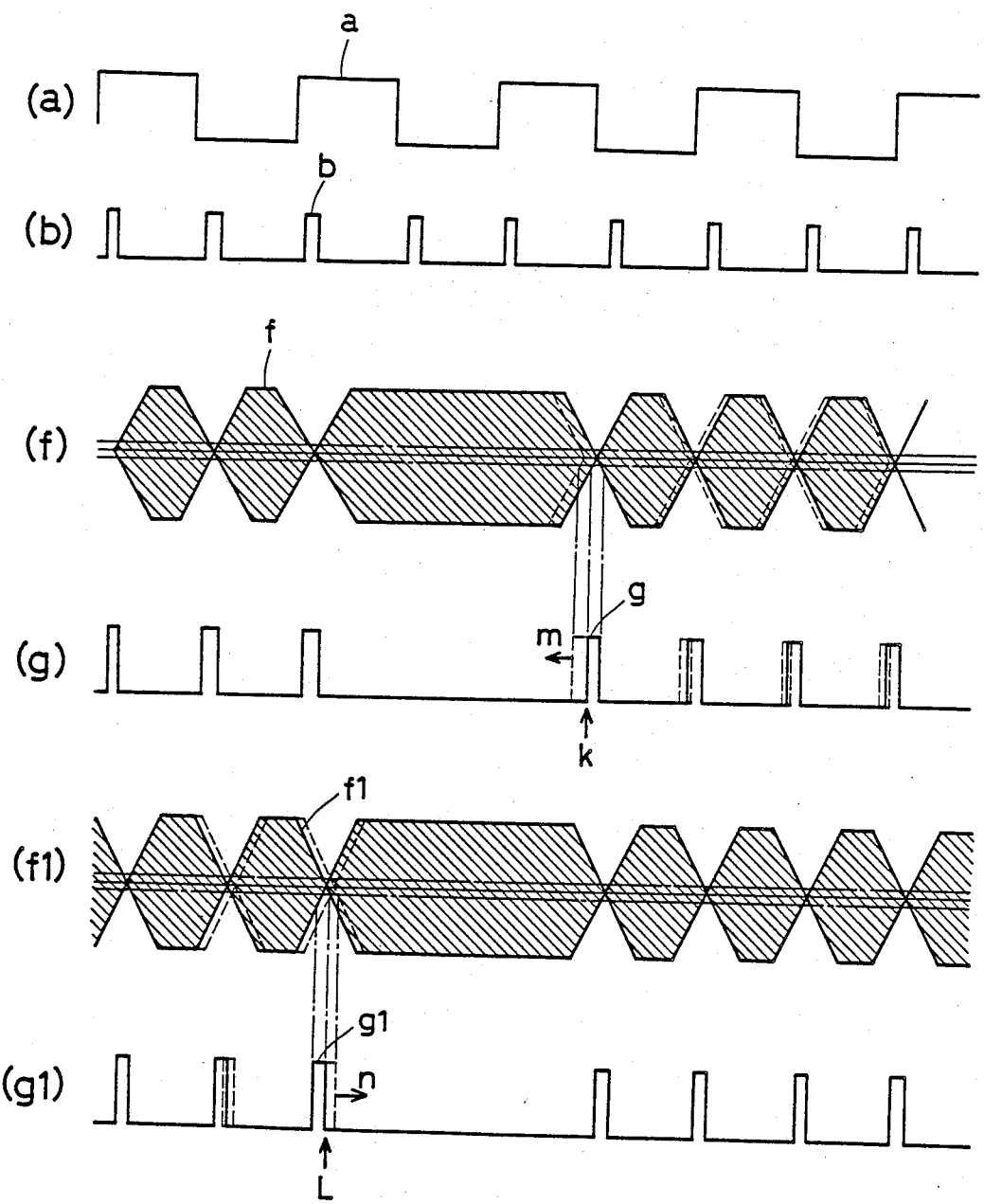

In the foregoing embodiment of the present invention, it has been described that the adjustment of the position at which the magnetic tape 1 is stopped is carried out with the utilization of the video drop-out signal g obtained during the interruption of movement of the magnetic tape 1. However, as will subsequently be described in detail, the video drop-out signal obtained during the movement of the magnetic tape 1 can be utilized to adjust the position at which the magnetic tape 1 is stopped. By way of example, the traces 5 of movement of the magnetic head assemblies left on the length of magnetic tape 1, subsequent to the start of movement of the magnetic tape 1, and, prior to the stoppage thereof are indicated respectively by 5v, 5w, 5x, 5y and 5z in FIGS. 7a to 7c (wherein 5v shows the trace during stoppage of the tape 1, 5w shows the trace during acceleration to the normal speed, 5x shows the trace during the movement of the normal speed, 5y shows the trace during deceleration to the stoppage, and 5z shows the trace during the stoppage). At this time, the level of the reproduced video signal is apt to be lower at a lower portion of the recorded track s1 (corresponding to an upper portion of the picture being reproduced on the television monitor) and an upper portion of the recorded track s2 (corresponding to a lower portion of the picture being reproduced on the television monitor), causing so called "flush noise". Also, in the event that the trace 5y of movement of the head assembly left on the magnetic tape 1 is displaced on the leading side with respect to the direction of movement of the magnetic tape, during deceleration, the lowering of the level of the reproduced video signal occurs at the upper portion of the track s2, (lower portion of the picture) with the consequence that the video drop-out signal g is outputted at a position shown by k in the waveform (g) of FIG. 8 corresponding thereto, and, is necessarily outputted from the position of the upper portion k of the recorded track s2. In other words, the video drop-out signal g expands in width from the position k shown in the waveform (g) of FIG. 8 in a direction indicated by m.

On the other hand, in the event that the trace 5w of movement of the head assembly on the magnetic tape 1 is displaced on the trailing side with respect to the direction of movement of the magnetic tape 1, during acceleration, the lowering of the level of the reproduced video signal occurs at the lower portion of the recorded track s1 (upper portion of the picture). Accordingly, the video drop-out signal g1 is outputted at a position L shown in the waveform (g1) of FIG. 8 which corresponds thereto, and necessarily expands in width from the position L in a direction shown by n in the waveform (g1) of FIG. 8.

In view of the foregoing, where the video drop-out signal g is detected at the position k, the precise adjustment of the position at which the magnetic tape 1 is to be stopped can be accomplished by correcting the delay time of the delay circuit 41 so as to increase it, thereby delaying the start timing of the stopping operation. Similarly, where the video drop-out signal g is detected at the position L, it can be equally accomplished by correcting the delay time of the delay circuit 41 so as to decrease it, thereby advancing the start timing of the stoppage operation.

As hereinbefore fully described, the apparatus according to the present invention is provided with means for detecting the position at which the drop-out of the video signal occurs, and, for adjusting the timing at which the operation for stopping the movement of the magnetic tape starts. This is done so that the position at which the drop-out of the video signal has occurred can be shifted to a position within the vertical synchronizing signal contained in the reproduced video signal. Therefore, the apparatus of the present invention is effective to provide a noiseless slow motion picture, being reproduced on the television monitor, without requiring any manual adjustment such as that required in the prior art apparatus.

Although the present invention has fully been described in connection with the preferred embodiments thereof with reference to the accompanying drawings, it was used soley for the purpose of illustration. Those skilled in the art will readily conceive numerous changes and modifications within the framework of the present invention upon the reading of this specification. By way of example, although in the foregoing description of the preferred embodiments it has been described that the control signal c is inputted to the tape transport control circuit 42 in order to obtain the still picture reproduction, a different signal may be employed in place of the control signal c. More specifically, if a tachometer, or like means for counting the number of revolutions of the capstan drive motor 25, is employed in combination with a circuit for generating an output signal when a predetermined number of revolutions of the capstan drive motor 25 subsequent to the start thereof has been counted, such output signal may be used in place of the control signal c. Alternatively, the head switching signal a itself, can be used in place of the control signal c, to be inputted to the tape transport control circuit 42.

Also, in order to ensure a reliable operation, arrangement may be made so that the detecting operation performed by the video drop-out position detecting means 50 is performed a number of times. This may be done so that the detecting means 50 can generate the output representative of a detection value which may be either an average value, or a value belonging to a majority of signals which coincide with each other.

Moreover, in the foregoing embodiments, the delay time has been described as determined in reference to the quasi-vertical synchronizing signal b. However, according to the present invention, what is required is to control the position at which the magnetic tape is stopped, so that the drop-out portion of the reproduced video signal can fall within the vertical synchronizing period (signal existing period). Therefore, the signal used as a reference to the control of the position at which the operation for stopping the magnetic tape starts, may be any signal, provided that the latter has a predetermined relationship in phase with the vertical synchronizing signal contained in the reproduced video signal. Accordingly, as is the case in the foregoing embodiments, if a signal is extracted at the time the predetermined number of revolutions of the capstan drive motor 25 has been counted, subsequent to the start of drive of the capstan drive motor 25, this signal will represent the position of the magnetic tape after a predetermined length thereof has been transported. Therefore, it has a predetermined relationship in phase with the control signal c as well as the vertical synchronizing signal. Further, this signal can be used for controlling the timing at which the operation for stopping the movement of the magnetic tape is to be started.

Accordingly, such changes and modifications are to be understood as included within the true scope of the present invention as defined by the appended claims, unless they depart therefrom.

What is claimed is:

1. A magnetically recorded information reproducing apparatus of a helical scan type which is capable of performing still picture reproduction and normal picture reproduction alternately by means of at least two head assemblies which are supported for rotation about a common axis while a length of magnetic tape having video signals recorded thereon is intermittently moved therepast, the apparatus comprising:

detecting means for detecting a noise position at which the level of the video signal being reproduced decreases to a value lower than a predetermined value when the length of magnetic tape is in stoppage, acceleration, and deceleration; and control means for receiving an output signal from the detecting means during the stoppage and for controlling the timing, at which the subsequent interruption of movement of the length of magnetic tape is to be affected, thereby shifting the noise position into the period corresponding to the vertical synchronizing period, said control means receiving an output signal from the detecting means during the acceleration and advancing the timing by a predetermined time, and said control means receiving an output signal from the detecting means during the deceleration and delaying the timing by a predetermined time.

2. The apparatus as claimed in claim 1, wherein the detecting means comprised:
   level detecting means for detecting a decrease of the reproduced video signal below the predetermined value;
   arithmetic means for calculating the difference in phase between the output signal of the level detecting means and a signal used for vertically synchronizing the reproduced video signal; and
   correcting means for outputting a correction signal causing a result of the calculation to exhibit a predetermined phase difference which is established when the noise position is shifted into the period corresponding to the vertical synchronizing period.

3. The apparatus as claimed in claim 2, wherein the calculating circuit is so designed as to determine the difference in phase in dependence on the output signal from the level detecting circuit and a switching signal used to switching the head assemblies alternately.

4. The apparatus as claimed in claim 2, wherein the correcting circuit is operable to generate a signal necessary to render an output signal from the arithmetic circuit to be zero.

5. The apparatus as claimed in claim 1, wherein said control means comprises delay means for delaying a control signal for a predetermined delay time, to be used for controlling the transport of the magnetic tape, and a tape transport control means for receiving an output signal from the delay means and interrupting the movement of the magnetic tape.

6. The apparatus as claimed in claim 5, wherein the delay time of the delay circuit is adjustable in dependence on the output signal from the detecting means.

7. The apparatus as claimed in claim 5, wherein the tape transport control circuit releases the interruption of movement of the magnetic tape when a counted number of switching signals for the head assemblies attains a predetermined value.

8. A magnetically recorded information reproducing apparatus for enabling a slow motion reproduction of a video signal recorded on a length of magnetic tape, comprising:
   a tape guide cylinder including a stationary drum and a rotary drum supported for rotation relative to the stationary drum;
   means for moving said length of magnetic tape around the tape guide cylinder while contacting said drum through a predetermined angle with respect to an axis of rotation of the rotary drum;
   means for scanning the length of the magnetic tape repeatedly comprising at least two magnetic head assemblies carried by the rotary drum for rotation therewith and spaced a predetermined angular distance from each other with respect to the axis of rotation of the rotary drum, each of said magnetic head assemblies;
   a capstan drive motor for driving the length of magnetic tape in one direction around the tape guide cylinder;
   a reproducing means for interlacing the output signals developed from each of the head assemblies for producing a reproducing video signal;
   a level detecting means for detecting the lowering of the level of an output from the reproducing means below a predetermined level when the magnetic tape is in stoppage, acceleration, and deceleration,
   arithmetic means for calculating the difference in phase between an output signal from the level detecting means and a signal used for vertical synchronizing of the reproduced video signal;
   delay means for delaying for a predetermined delay time a control signal for controlling the transport of the magnetic tape;
   correcting means for varying the delay time of the delay means to a value required for an output from the arithmetic means during the stoppage to become zero, for decreasing the delay time when the noise is detected during the acceleration and for increasing the delay time when the noise is detected during the deceleration;
   a tape transport control means for receiving an output signal from the delay means for stopping the capstan drive motor; and
   counting means for releasing a stopping operation of the tape transport control means when the number of scans of the head assemblies counted, subsequent to the interruption of operation of the capstan drive motor, attains a predetermined value determined as a function of a slow motion reproducing speed.

9. The apparatus as claimed in claim 8, wherein the arithmetic circuit calculates a time corresponding to the difference in phase.

10. The apparatus as claimed in claim 9, wherein the correcting circuit is operable to add or subtract the time calculated by the arithmetic circuit to or from the delay time of the delay circuit.

11. A magnetically recorded information reproducing apparatus of a helical scan type which is capable of performing still picture reproduction and normal picture reproduction alternately by means of at least two head assemblies which are supported for rotation about a common axis while a length of magnetic tape having video signals recorded thereon is intermittently moved there past, the apparatus comprising:
   detecting means for detecting a drop-out c position at which the level of the video signal being reproduced decreases to a value lower than a predetermined value when the length of magnetic tape is in stoppage, acceleration and deceleration; and
   control means for receiving an output signal from the detecting means during the stoppage and for controlling the timing, at which the subsequent interruption of movement of the length of magnetic tape is to be affected, thereby shifting the drop-out position into the period corresponding to the vertical synchronizing period, said control means receiving an output signal from the detecting means during acceleration and advancing the timing by a predetermined time, and said control means receiving an output signal from the detecting means during deceleration and delaying the timing by a predetermined time.

12. The apparatus as claimed in claim 11, wherein the detecting means comprised:
 level detecting means for detecting a decrease of the reproduced video signal below the predetermined value
 arithmetic means for calculating the difference in phase between the output signal of the level detecting means; and
 a signal used for vertically synchronizing the reproduced video signal; and
 correcting means for outputting a correction signal causing a result of the calculation to exhibit a predetermined phase difference which is established when the drop-out position is shifted into the period corresponding to the vertical synchronizing period.

13. The apparatus as claimed in claim 12, wherein the calculating means is so designed as to determine the difference in phase in dependence on the output signal from the level detecting means and a switching signal used to switch the head assemblies alternately.

14. The apparatus as claimed in claim 12, wherein the correcting means is operable to generate a signal necessary to render an output signal from the arithmetic means to be zero.

15. The apparatus as claimed in claim 11. wherein said control means comprises delay means for delaying a control signal, for a predetermined delay time, to be used for controlling the transport of the magnetic tape, and a tape transport control means for receiving an output signal from the delay means and interrupting the movement of the magnetic tape.

16. The apparatus as claimed in claim 15, wherein the delay time of the delay means is adjustable in dependence on the output signal from the detecting means.

* * * * *